INVENTOR.
CARL E. KITTLE

United States Patent Office 3,721,160
Patented Mar. 20, 1973

3,721,160
HYDRO-MECHANICAL DETENT MECHANISM
Carl Edwin Kittle, Cedar Falls, Iowa, assignor to
Deere & Company, Moline, Ill.
Filed Oct. 26, 1970, Ser. No. 84,053
Int. Cl. F15b 13/04
U.S. Cl. 91—426    10 Claims

ABSTRACT OF THE DISCLOSURE

A detent mechanism is provided for holding a selective control valve in a pair of active positions respectively wherein one or the other of the work ports of a double-acting hydraulic cylinder is connected to a source of fluid pressure while the remaining work port is connected to a sump. The detent mechanism includes a cam which is fixed to and swings with a lever for shifting the control valve. When the lever is swung to shift the control valve to one or the other of the active positions, one or the other of a pair of recesses in the cam is respectively placed in register with a roller of a cam-following detent element. A piston rod is bearingly engaged with the detent element and a force for holding the roller in the recesses is derived from the co-action of a biasing spring positioned against a piston carried by the rod and a pressure drop coupled across the piston, which pressure drop is induced by a metering valve for metering flow to the cylinder. The piston rod includes sections of different diameters exposed to fluid pressure at the opposite sides of the piston and when the pressure drop across the piston falls to zero as the cylinder reaches an end of a stroke, the pressure then normally existing at the opposite sides of the piston acts upon the different axially-projected areas of the rod and piston to exert a force substantially equal and opposite to that of the biasing spring. Thus, the detent force tending to keep the roller in one or the other of the recesses is reduced to the point where the force to a return-to-neutral spring acting on the control valve overcomes the detent force and moves the cam to disengage the roller from the recess.

BACKGROUND OF THE INVENTION

The present invention relates to a detent mechanism for holding a selective control valve in desired positions for controlling a two-way hydraulic cylinder. More particularly, the present invention relates to a detent mechanism of a type wherein a piston and rod assembly is operatively connected to a detent element and wherein the pressure drop developed across a pressure compensated valve assembly, for supplying fluid at a preselected flow rate to the cylinder, is connected across the piston to control the application of force to the detent element.

In a known detent mechanism of the above-noted type, the pressure drop developed across the pressure compensated valve assembly is the sole means by which the detent element is controlled. Due to imperfect pressure compensation, the pressure drop developed across the pressure compensated valve assembly fluctuates enough from a desired preset value to make it difficult to manually override the detent mechanism when the pressure drop is higher than the preset value and to prematurely permit the control valve to move past the detent element to its neutral position when the pressure drop is lower than the preset value.

SUMMARY OF THE INVENTION

According to the present invention, there is provided a novel selective control valve position detent mechanism and more particularly there is provided a novel detent force-applying means.

It is an object of the invention to provide a detent mechanism including means for applying a substantially constant detent force. Another object is to provide a detent mechanism wherein the detent force applied thereby is due to the co-action of a mechanical force and a hydraulic force.

A more specific object is to provide a detent mechanism of the above type wherein the hydraulic force is applied by means responsive to flow to the actuator and acts to nullify the effect of the mechanical force when the actuator being controlled reaches an end of a stroke.

Still another object is to provide a detent mechanism which is compact and easy to assemble.

These and other objects will be apparent from the ensuing description and appended drawings.

DESCRIPTION OF THE PREFERRED EMBODIMENT

Figure 1:
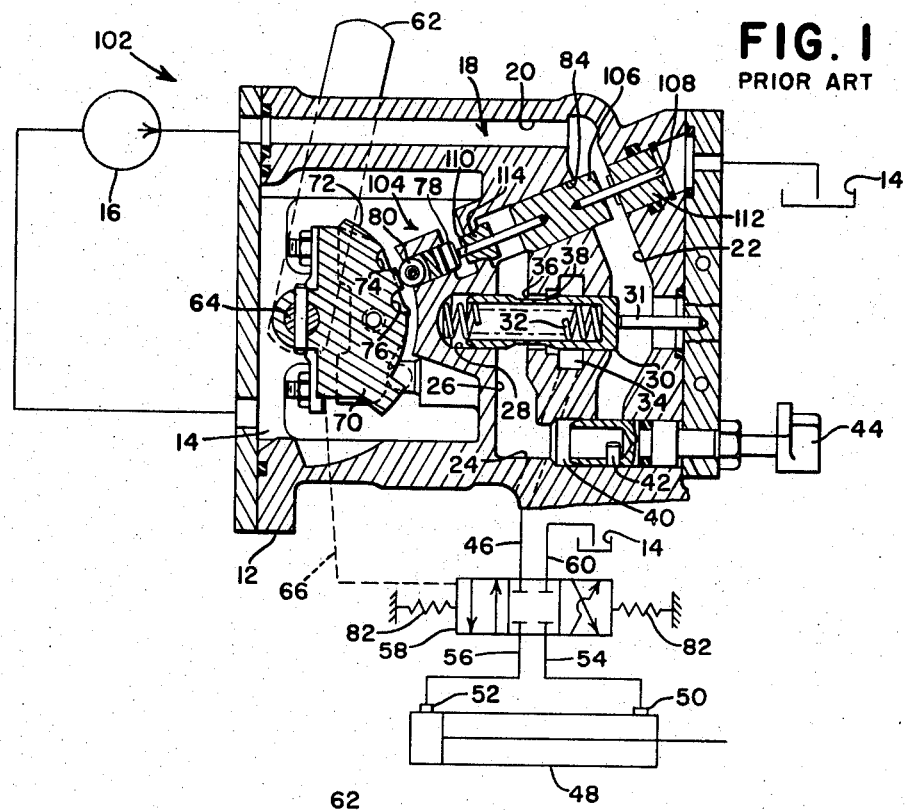
FIG. 1 is a partially schematic and sectional view of a fluid control system embodying a prior art control valve position detent mechanism.
Figure 2:
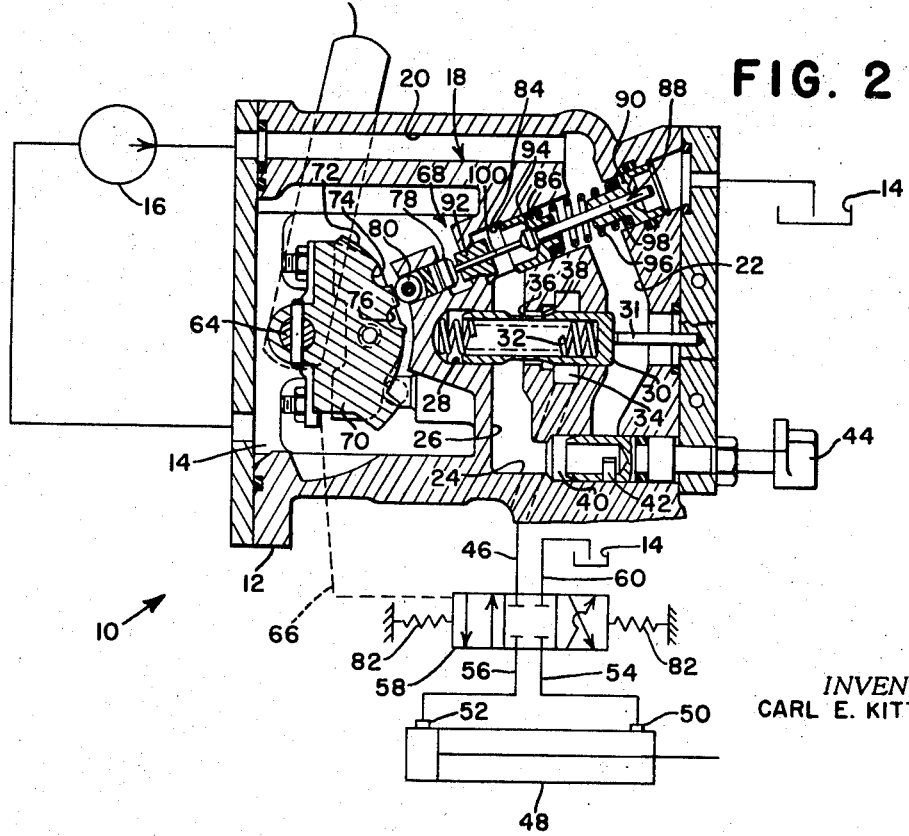
FIG. 2 is a view similar to FIG. 1 but showing the dentent mechanism of the present invention embodied therein.

Referring now to the drawings, it is to be noted that a prior art detent mechanism is embodied in the system illustrated in FIG. 1 and that the present invention is embodied in the system illustrated in FIG. 2. Also, it is to be noted that the parts common to both systems have been given the same reference numeral and that these common parts function identically in both systems.

Referring now to FIG. 2, a fluid control system is designated in its entirety by the reference numeral 10. The system 10 includes a housing 12 forming a cavity which serves as a sump 14. A pump 16 has its inlet connected to draw fluid from the sump 14 and has its outlet connected to one end of a fluid passage 18 which, as viewed in FIG. 2, includes portions 20, 22, 24 and 26 which, with reference to the inlet te the passage 18, respectively extend rightwardly, downwardly, leftwardly and upwardly in the housing 12. A first bore 28 interconnects the portions 22 and 26 intermediate their ends and a pressure-compensated flow control valve member 30 is slidably mounted in the bore 28 and blocks fluid communication between and has its opposite ends exposed to pressure in the passage portions 22 and 26. The valve member 30 is biased rightwardly against a stop pin 31 by a control spring 32. The bore 28 includes an outlet port 34 which is connected to the passage portion 26 via a fluid passage defined by an annular groove 36, about the valve member 30, which cooperates with an annular recess 38 in the bore 28 to provide a variable orifice which decreases in size as the valve member 30 shifts leftwardly against the spring 32.

The passage portion 24 joins the bottoms of the passage portions 22 and 26 and rotatably mounted therein is a tubular metering valve member 40 having a metering port 42 which is selectively moved to positions of varying exposure to the passage portion 22 by pivoting a handle 44 which is located outside the housing 12. Thus, different desired rates of flow between the pump 16 and the outlet port 34 in the bore 28 can be preselected by the proper positioning of the port 42 relative to the passage portion 22. It is to be noted that during flow, a predetermined pressure drop will occur across the valve member 40 when normal operating pressures exist. Since the opposite ends of the valve member 30 are exposed to fluid pressures existing in the passage portions 22 and 26, this predetermined pressure drop also occurs across the valve member 30 and the valve member 30 will assume a position wherein the desired flow rate will occur through the orifice defined by the groove 36 and the recess 38. When pressure fluctuations occur in the system which disturb the predetermined pressure drop, the valve member 30 will shift accordingly to increase or decrease the orifice opening to maintain the desired flow rate.

The fluid thus controlled by the valve members 30 and 40 passes from the outlet port 34 of the bore 28 to a pressure line 46 for supplying fluid to a reversible hydraulic motor here shown as a two-way hydraulic cylinder 48. The cylinder 48 includes work ports 50 and 52 which are respectively connected to a pair of control lines 54 and 56. A selective control valve 58 is interconnected between the pressure line 46, a return line 60 and the control lines 54 and 56. A valve positioning lever 62 is fixed to a shaft 64 which extends through and is pivotally mounted in the opposite walls of the sump 14. The lever 62 is operatively connected to the control valve 58 by a connection represented schematically by the dashed line 66. It is to be noted that the control valve 58 would normally be located in the housing 12 but is shown removed therefrom and illustrated schematically for the sake of simplicity.

The control valve 58 is shown in an intermediate neutral position wherein fluid is blocked in the opposite work ports 50 and 52 of the cylinder 48. When the lever 62 is swung counterclockwise from the position illustrated, the control valve 58 is shifted rightwardly to a first active position wherein the pressure line 46 is connected to the work port 52 and the return line 60 is connected to the work port 50. These connections are reversed when the lever 62 is swung clockwise from the illustrated position and the control valve 58 is shifted leftwardly to a second active position.

For the purpose of automatically retaining the control valve 58 in an active position once it has been shifted thereto manually, there is provided a detent or lock mechanism 68. The detent mechanism 68 includes a cam 70 which is located in the sump cavity 14 and is secured to the shaft 64 so as to be rocked therewith when the lever 62 is swung to selectively position the valve 58. The cam 70 has an arcuate surface 72 in which there is a pair of circumferentially-spaced semi-cylindrical recesses 74 and 76. A detent element 78 is reciprocally mounted in the housing 12 for movement toward and away from the surface 72 and carries a roller 80 which follows the surface. In the illustrated position of the cam 70, the roller 80 is located midway between the recesses 74 and 76. The roller 80 moves respectively into the recesses 74 and 76 when the lever 62 is swung clockwise or counterclockwise from the position illustrated to shift the control valve 58 to one of its active positions. When the roller 80 is in one of the recesses 74 and 76, and a force equal to or greater than a predetermined minimum force is applied to the detent element 78, the rollers 80 will be seated in the associated recess such as to hold the cam 70, hence the control valve 58, in position. However, when the force on the element 78 falls below the predetermined minimum value, a pair of neutralizing springs 82 acting on the control valve 58 will return the cam 70 to the illustrated position.

The detent mechanism 68 includes a hydro-mechanical means for applying controlling forces to the detent element 78. Specifically, the detent mechanism 68 includes a bore 84 which is located in the housing 12 in axial alignment with the detent element 78 and is connected adjacent its opposite ends to the passage portions 22 and 26. A piston 86 is slidably mounted in the bore 84 and effectively blocks fluid communication therethrough between the passage portions 22 and 26. Thus, it can be seen that any pressure drop which occurs across the valve members 30 and 40 will likewise occur across the piston 86. The piston 86 is coaxially received on a piston rod 88, which extends through plugs or guides 90 and 92 respectively in the right and left ends of the bore 84. The left end of the rod 88 is in bearing engagement with the detent element 78, and forces tending to move the piston 86 to the left are transferred directly to an annular seat 94 on the rod 88, against which the left side of the piston 86 is biased by a spring 96, which acts between the right side of the piston 86 and the right plug 90. The spring 96, in addition to holding the piston 86 in engagement with the seat 94, also provides a substantially constant mechanical force, which is transferred through the rod 88 to the detent element 78.

The annular seat 94 is between a first rod section 98, on which the piston 86 is received and which extends rightwardly from the seat 94, and a second rod section 100, which is slightly smaller in diameter than the rod section 98 and extends leftwardly from the seat 94. This difference in diameter results in a lesser axially-projected area of the surfaces of the piston 86 and rod 88 being exposed to fluid pressure at the right side of the piston 86 than the axially-projected area of the piston and rod surfaces exposed to fluid pressure at the left side of the piston 86. The dimensions of the rod sections 98 and 100 are so chosen that, when equal fluid pressure, of a magnitude usually found in the passage portions 22 and 26 when the cylinder 48 reaches an end of a stroke, exists on the opposite sides of the piston 86, the net fluid force exerted on the piston 86 and the rod 88 will be substantially equal and opposite to the force exerted on the piston 86 by the spring 96. When the spring force is so nulled, the neutralizing springs 82 are effective to return the control valve 58 to its neutral position.

During the movement of the cylinder 48 between the extremes of a stroke, the difference in the axially-projected areas of the piston 86 and the rod 88 are such as to reduce the effect that the pressure drop across the piston 86 has on the force applied to the detent element 78, since the greatest pressure is exerted against the lesser axial area at the right of the piston 86 and the lesser pressure acts against the greater axial area at the left of the piston 86. The force exerted by the spring 96 on the piston 86 is slightly larger than the predetermined minimum force necessary to keep the detent element 78 engaged in one or the other of the recesses 72 and 74, and the differences in axial areas at the opposite sides of the piston 86 is such that only small amounts of force are added to or subtracted from the force exerted on the piston 86. Thus, the force applied to the detent element 78, during stroking of the cylinder 48, remains substantially constant. This is important, since the detent mechanism 68 can then be manually overridden by applying approximately the same effort to the lever 62 irregardless of the changes in operating pressures normally occurring on the opposite sides of the piston 86.

Referring now to FIG. 1, there is shown a control system 102 embodying a prior art detent mechanism 104, which is illustrated in order that applicants' contribution to the art may be more readily perceived.

The detent mechanism 104 includes the cam 70, the detent element 78 and the bore 84 described above relative to the detent mechanism 68. The structure for applying the force to and controlling the element 78 is different, however, and includes a cylindrical piston 106 slidably mounted in the bore 84 between the passage portions 22 and 26. Extending oppositely from the right and left ends of the piston 106 are equidiameter rods 108 and 110, which respectively extend through guides or plugs 112 and 114 in the right and left ends of the bore 84, respectively. The left end of the rod 110 is positioned for bearing engagement with the detent element 78.

Thus, it can be seen that the only force operative for holding the detent element 78 engaged with one of the recesses 74 and 76 in the cam 70 is that due to the pressure drop occurring across the metering valve 40. It can further be seen that if this pressure drop fluctuates any appreciable amount from desired values, due to the spring constant of the spring 32 or to any other reasons, it may become difficult to manually override the detent mechanism 104 or the detent force may fall below that required to keep the detent element 78 engaged resulting in the control valve 58 being shifted prematurely to the neutral position by the springs 82.

The operation of the detent mechanism 68 is briefly summarized as follows. Assuming that the control system 10 is in the neutral condition illustrated, the control valve 58 effectively blocks fluid flow to and from the actuator 48, and the lever 62 and cam 70 are positioned such that the roller 80 is midway between the recesses 74 and 76 in the surface 72. If it is desired to extend the cylinder 48, the lever 62 is swung counterclockwise to connect the work ports 52 and 50 respectively with the pressure and return lines 46 and 60. Instantaneously with such connection, flow begins through the metering port 42 of the valve member 40, and a pressure drop occurs thereacross. This pressure drop likewise occurs across the piston 86, and, depending on the size of the pressure drop relative to the pressure existing in the passage portions 22, the pressures acting on the different axially-projected areas of the piston 86 and rod 88 on the opposite sides of the piston 86 will result in a small force being either added to or subtracted from the force exerted on the piston 86 by the spring 96. In any event, the net force acting on the detent element 78 is sufficient to hold it in the recess 76 until the cylinder 48 becomes completely extended.

Upon the cylinder 48 becoming completely extended, flow will no longer enter the work port 52, and the pressure at the opposite sides of the metering port 42 will equalize. In other words, when the cylinder 48 reaches the end of its extension stroke, the pressure drop across the metering valve 40 will fall to zero. When this happens, the pressure acting on the larger axially-projected area of the piston 86 and rod 88 at the left of the piston 86 will exert a force which is an amount, greater than the force acting on the right side of the piston 86, sufficient to offset the force exerted on the right side of the piston 86 by the spring 96. The neutralizing spring 82 will then be effective, via the valve 58 and the connection 66, to move the cam 70 past the detent elements 78 and return the valve 58 to neutral.

It is to be noted that during extension or retraction of the cylinder 48, the detent mechanism 76 may be manually overridden by exerting a nominal force to the lever 62. This force required to overcome the detent force remains substantially constant regardless of the ordinary fluctuations in the system pressure, since the effect of such fluctuations is minimized by the unique relationship between the differences in diameter of the rod sections 98 and 100 and the normal operating pressures at the opposite sides of the piston 86.

I claim:

1. In combination, a direction control valve, a reversible hydraulic actuator, and a detent mechanism for holding said control valve in selected positions; said actuator including a pair of work ports and being movable between a pair of stop positions; said control valve being operatively connected to said actuator and shiftable among neutral, first active, and second active positions for respectively blocking the flow of fluid to and from said pair of work ports and alternately connecting a source of fluid pressure to one or the other of the work ports while connecting the remaining work port to a sump; a cam operatively connected to and simultaneously shiftable with said control valve among first, second and third positions corresponding to said neutral and first and second active positions of said control valve; means biasing said control valve and cam respectively to their neutral and first positions of said control valve; means biasing said control following detent element mounted for following said cam and for respective engagement with said detent engageable means when said cam is in said second and third positions; force-applying means operatively connected to said detent element for urging the same into holding engagement with said detent engageable means to hold said control valve in a selected active position during movement of said actuator between said stop positions; said force-applying means including a substantially constant force-applying means and a differential area variable force-applying means the constant force-applying means acting in a direction tending to engage the detent element and the variable force-applying means being responsive to flow to said actuator for combining with said substantially constant force-applying means for acting upon said detent element to engage the same when flow is entering said actuator, and for nullifying said substantially constant force when no flow is entering the actuator as the latter reaches a stop position.

2. A fluid control system, comprising: a source of fluid pressure; a reservoir; a hydraulic actuator; a control valve fluid-connected to said source, reservoir and actuator and being shiftable at least between a neutral position blocking flow to and from the actuator and a first active position permitting fluid to flow from the source to the actuator; a detent means for automatically selectively holding the control valve in the active position, the detent means including cam means connected to and shiftable with the control valve between first and second positions respectively corresponding to the neutral and active positions of the control valve; biasing means urging the control valve and cam means to their respective neutral and first positions; a detent element disposed for following said cam means; said cam means including means for cooperating with the detent element for holding the cam means in said second position when at least a predetermined minimum force is applied to said detent element in a first direction for engaging the detent element with the cam means; force-applying means operatively associated with said detent element and including a substantially constant force-applying means acting against said detent in said first direction; said force-applying means further including a variable force-applying means fluid-connected between said source and actuator and being responsive to flow conditions between said source and actuator when said control valve is in said first active position for constantly combining with said constant force-applying means for applying said predetermined minimum force to said detent element in said first direction when a predetermined flow condition exists between the source and actuator and for nullifying the effect of the constant force-applying means on the detent element when the flow condition varies from said predetermined flow condition, thus, permitting the biasing means to return the control valve and cam means to their respective neutral and first positions.

3. The invention defined in claim 2 and further including flow restrictor means fluid-connected between the source and actuator for causing a pressure drop when fluid is flowing between the source and actuator; said variable force-applying means including pressure-responsive means responsive to the pressure drop caused by said restrictor means for adding to the force applied to the detent element by the constant force-applying means when the pressure drop across the restrictor means is above a predetermined value, for subtracting from the force applied to the detent element by the constant force-applying means when the pressure drop across the restrictor means is a value below said predetermined value but above zero pressure drop and for nullifying the effect of the constant force-applying means on the detent element when the pressure drop across the restrictor means falls to zero.

4. The invention defined in claim 3 wherein said pressure-responsive means includes a cylindrical bore; a piston slidably mounted in the bore; a rod extending from one side of the piston and forming therewith a rod and piston assembly, the rod engaging the detent element; and said rod and piston assembly having opposite ends having first and second axially-projected areas respectively exposed to fluid pressure upstream and downstream from the flow restrictor means, the area exposed to the upstream pressure being smaller than that exposed to the downstream pressure.

5. The invention defined in claim 4 wherein said constant force-applying means is a helical compression spring and is located in said bore with one end in bearing engagement with said piston.

6. The invention defined in claim 4 wherein said bore has opposite closed ends and said rod extends axially from the opposite sides of said piston respectively through said closed ends of the bore; and said rod being stepped down in diameter to one side of said piston and thus providing an axially-projected area exposed to fluid pressure at said one side of said piston which is greater than the axially-projected area exposed to fluid presure at the other side of said piston.

7. The invention defined in claim 6 wherein the constant force-applying means includes means applying a force to said detent element slightly larger than said predetermined minimum force and the opposite projected areas of said piston and rod assembly being sized such that when the presure drop across said flow restrictor means is a value slightly above said predetermined value, the piston and rod assembly will act to add a small amount of force to that applied on the detent element by the constant force-applying means, that when the pressure drop, across the flow restrictor means is a value slightly below said predetermined value, the rod and piston assembly will act to subtract a small amount of force from that applied on the detent element by the constant force-applying means and that when the pressure drop across the flow restrictor means falls to zero, the rod and piston assembly act to subtract substantially all of the force applied on the detent element by the constant force-applying means.

8. A fluid control system, comprising: a source of fluid pressure; a reservoir; a hydraulic actuator; a control valve fluid-connected to said source, actuator and reservoir and being shiftable at least between a neutral position blocking flow to and from the actuator and a first active position permitting fluid to flow from the source to the actuator; a detent means for automatically selectively holding the control valve in the active position, the detent means including cam means connected to and shiftable with the control valve between first and second positions respectively corresponding to the neutral and active positions of the control valve; biasing means urging the control valve and cam means to their respective neutral and first positions; a detent element mounted for following said cam means, the latter including means cooperating with the detent element for retaining the cam means in said second position when the detent element is held engaged with said cam means by at least a predetermined minimum force; flow control valve means being fluid-connected between the source and actuator for maintaining a preselected rate of flow from the source to the actuator at a preselected pressure drop when the control valve is in the active position and normal operating pressures exist at the source and actuator, the pressure drop across the valve means increasing or decreasing from the preselected pressure drop in accordance with abnormal operating pressures occurring at the source and actuator; force-applying means operatively associated with said detent element and including a substantially constant force-applying means acting against said detent; said force-applying means further including a variable force-applying means fluid connected between said source and actuator and being responsive to flow conditions between said source and actuator when said control valve is in said first active position for constantly combining with said control force-applying means for applying said predetermined minimum force to said detent element when a predetermined flow condition exists between the source and actuator and for nullifying the effect of the constant force-applying means on the detent element when the flow condition varies from said predetermined flow condition, thus, permitting the biasing means to return the control valve and cam means to their respective neutral and first positions.

9. The invention defined in claim 8 wherein said variable force-applying means includes a cylindrical bore having its longitudinal axis disposed in alignment with said detent element; a piston slidably mounted in the bore; a rod extending from that side of the piston closest to the detent element thus forming a rod and piston assembly, the rod engaging said detent element; the end of the rod and piston assembly closest said detent element having a first axially-projected area connected to fluid pressure downstream from the valve means and the opposite end of the rod and piston assembly having a second axially-projected area less than the first area connected to fluid pressure upstream from the valve means.

10. The invention defined in claim 9 wherein said bore has opposite closed ends and said rod extends axially from the opposite sides of said piston respectively through said closed ends of the bore; and said rod being stepped down in diameter to one side of said piston and thus providing an axially-projected area exposed to fluid pressure at said one side of said piston which is in addition to the axially-projected area exposed to fluid pressure at the other side of said piston.

References Cited

UNITED STATES PATENTS

| | | | |
|---|---|---|---|
| 2,610,613 | 9/1952 | Bryant | 91—417 R |
| 2,276,979 | 3/1942 | Jacobi | 137—624.27 |
| 2,689,585 | 9/1954 | Presnell | 91—426 X |
| 2,759,456 | 8/1956 | Court | 137—624.27 X |
| 2,844,166 | 7/1958 | Edman | 137—624.27 |
| 3,106,065 | 10/1963 | Stacey | 137—624.27 X |

MARTIN P. SCHWADRON, Primary Examiner

I. C. COHEN, Assistant Examiner

U.S. Cl. X.R.

137—624.27